United States Patent [19]

Anderson et al.

[11] Patent Number: 4,820,178

[45] Date of Patent: Apr. 11, 1989

[54] OUTLET BOX FOR ELECTRIC BUSWAY SYSTEM

[75] Inventors: John D. Anderson; Lynn M. Harton, both of Selmer, Tenn.; David A. Hibbert, South Windsor, Conn.

[73] Assignee: General Electric Company, New York, N.Y.

[21] Appl. No.: 203,952

[22] Filed: Jun. 8, 1988

[51] Int. Cl.[4] ............................................ H01R 25/16
[52] U.S. Cl. ..................................... 439/212; 439/114
[58] Field of Search ............... 174/68.2; 439/207–213, 439/114

[56] References Cited

U.S. PATENT DOCUMENTS

| | | | |
|---|---|---|---|
| 3,339,009 | 8/1967 | Davis et al. | 439/212 |
| 4,688,146 | 8/1987 | Newmark et al. | 361/364 |
| 4,714,431 | 12/1987 | McGoldrick et al. | 439/212 |

Primary Examiner—Gary F. Paumen
Attorney, Agent, or Firm—Richard A. Menelly; Walter C. Bernkopf; Fred Jacob

[57] ABSTRACT

Molded plastic outlet boxes are attached to an electric busway power distribution system at each location along the system where the bus bar conductors are provided with plug-in stabs. Slotted openings arranged through a top of the outlet box are centered with respect to the busway stabs to assist in connection therewith. A molded plastic access cover can be mounted optionally on either side of the box to electrically isolate the busway stabs.

10 Claims, 3 Drawing Sheets

OUTLET BOX FOR ELECTRIC BUSWAY SYSTEM

BACKGROUND OF THE INVENTION

Electric busway distribution systems comprise a plurality of rectangular bus bar conductors arranged within a metallic housing for providing electric power to industrial buildings. Every two feet or so, the bus bars are provided with upstanding contact blades to allow for connection with a power take-off assembly. One such power distribution system is described within U.S. Pat. No. 4,758,172 filed Oct. 13, 1987 entitled "Power Distribution Busway System". This Patent Application describes contact blades extending from the individual phases of a multi-phase power distribution system that are arranged for electrical connection with a power take-off assembly. In this arrangement, the contact blades are formed from the bus bar conductors themselves. U.S. patent application Ser. No. 203,751 entitled "Insulated Electrical Power Distribution Busway Tabs" describes the use of off-set tabs welded to the individual bus bars to provide the stabs for connecting with power take-off assemblies. U.S. patent application Ser. No. 122,863 filed Nov. 19, 1987 entitled "Thermally Efficient Power Busway Housing" describes a power busway housing design that is used with the molded case outlet box of the instant invention. All of the aforementioned U.S. Patent Applications are incorporated herein for purposes of reference.

U.S. Pat. No. 4,714,431 entitled "Electrical Distribution System Having an Improved Plug-In Assembly for Current Tap-Off" describes the bus bar conductors that are spaced apart at periodic intervals for the insertion of the receiver stabs. The base portion of the plug-in assembly includes insulating means extending between the individual bus bars for electric isolation.

SUMMARY OF THE INVENTION

A molded plastic electric power distribution busway outlet box is attached to an electric power distribution busway system at regular intervals to electrically insulate the bus bar take-off stabs extending therefrom. The stabs generally consist of off-set metal tabs welded at one end to the bus bars with the opposing ends upstanding for ease in connection with a power take-off assembly. The outlet box includes a slotted base member attached to the busway system housing and a molded plastic door hingably attached to the base for electrically isolating the bus bar stabs.

DESCRIPTION OF THE PREFERRED EMBODIMENT

Figure 1:
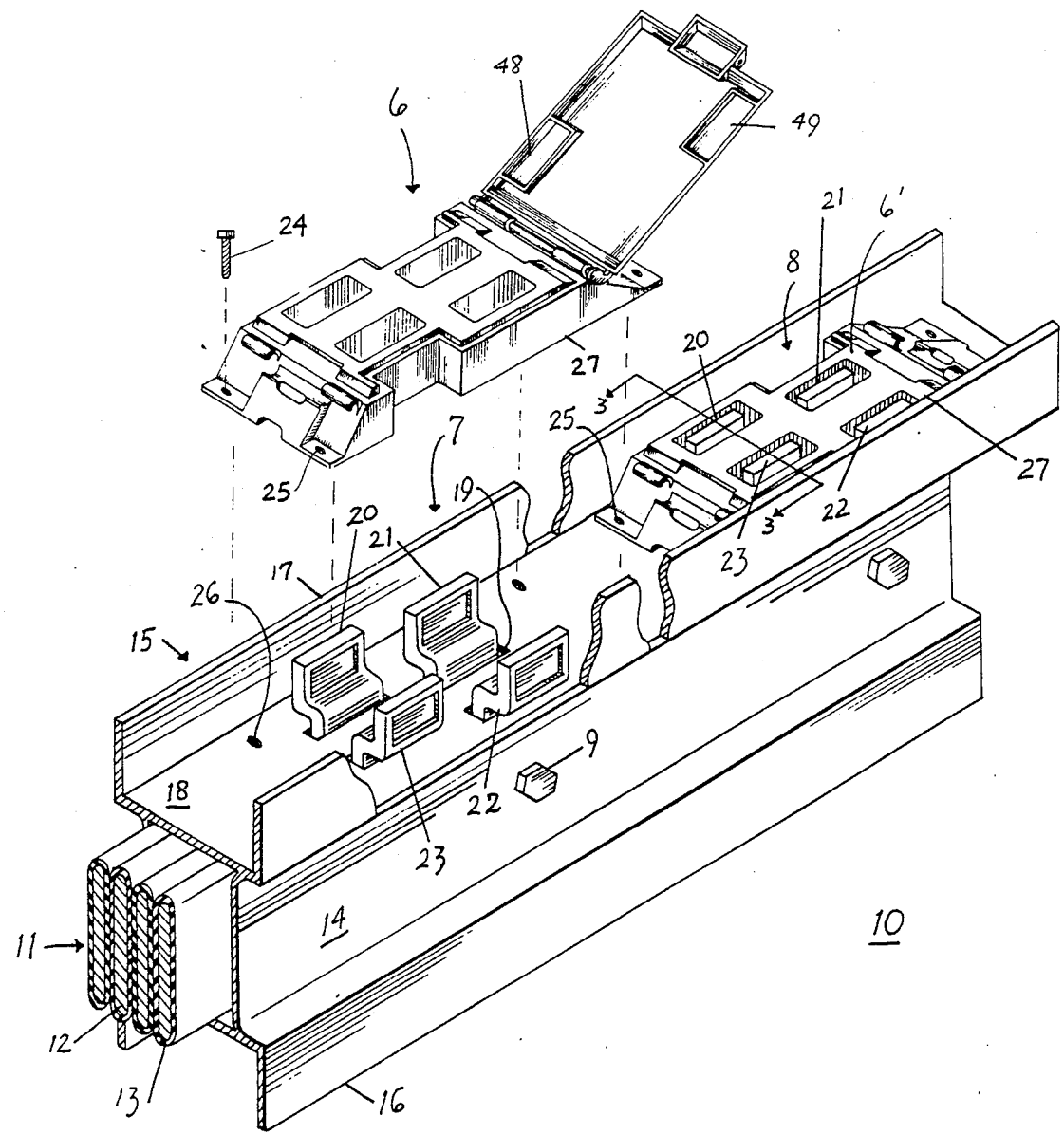
FIG. 1 is a top perspective view of an electric power distribution busway system with the molded case outlet box in isometric projection.
Figure 2:
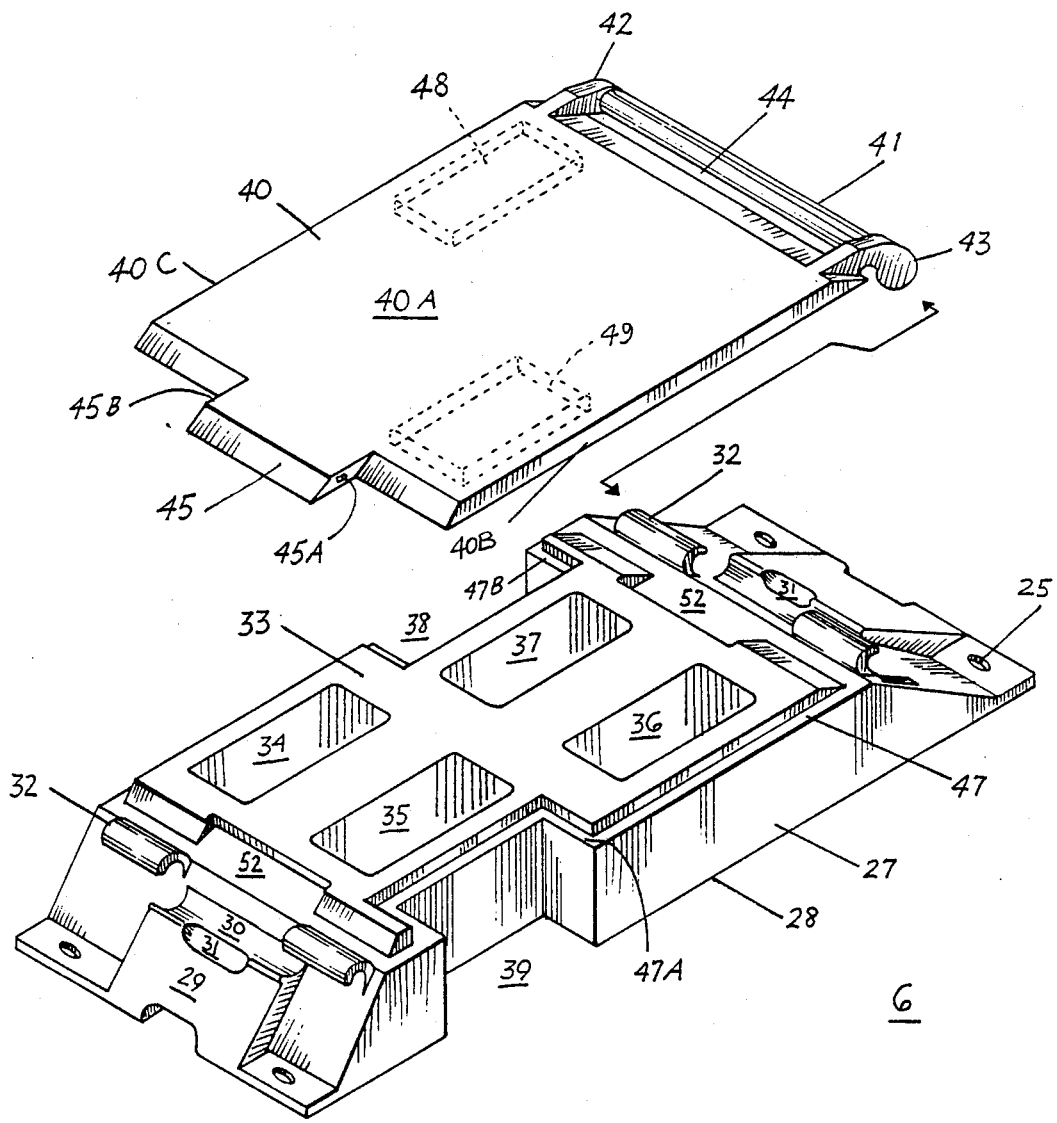
FIG. 2 is an enlarged top perspective view of the outlet box of FIG. 1 prior to the assembly of the outlet box cover to the outlet box base.

A busway section 10 similar to that described in aforementioned U.S. patent application Ser. Nos. 107,320 and 203,951 is depicted in FIG. 1 wherein the bus conductors 11 of the type consisting of a rectangular bar 12 of aluminum or copper are each provided with an electrically insulating epoxy coating 13 and are arranged within a continuous housing 14 consisting of first and second side frames 15, 16 which support the bus bars as well as provide ground conduction to the busway section. In accordance with the teachings contained within the aforementioned U.S. patent application Ser. No. 122,863, the bus bars are not "bumped" or otherwise separated at each plug-in section as indicated at 7 and 8 herein to facilitate connection with a power take-off assembly (not shown). Instead, welded contact blade tabs such as 20-23 are off-set from each other to accommodate connection with the power take-off assemblies. The contact blade tabs that are welded to the individual bus bars and the epoxy coating is removed from a part of the tabs to provide good electrical connection therewith. The contact blade tabs extend above the cross-piece 18 that joins the upstanding rails 17 on the first and second side frames 15, 16 that make up the busway section 10 through corresponding cross-piece slots 19. The busway sections and bus bars are fastened together by means of thru-bolts 9 provided through the busway section where the plug-in sections 7, 8 are located. In order to electrically isolate the upstanding contact blade tabs 20-23, a molded plastic plug-in enclosure 6 in accordance with the invention is arranged over the contact blade tabs by means of threaded openings 26 formed on the cross-piece 18 and by means of bolts 24 and thru-holes 25. One such molded plastic plug-in enclosure already attached to the plug-in section 8 is depicted at 6' to indicate the electrical isolation of the contact blade tabs 20-23 therein. The plug-in enclosure 6 as depicted in FIG. 2 consists of a molded plastic base 27 formed from a phenylene-oxide plastic sold by General Electric Company under the trademark "NORYL" or a polybutylene terepthalate which is sold under the General Electric trademark "Valox". The base is molded to include a planar bottom 28 through which the thru-holes 25 are formed and from which an inclined pedestal 29 extends upward to a digit access groove 31 formed at a top portion thereof. A planar top portion 33 defines a plurality of rectangular slots 34-36 that are off-set from each other to accommodate the upstanding contact blade tabs in a manner to be described below in some detail. Also formed within the planar top 33 are opposing channels 38, 39 which accommodate a ground lug that is separately attached to the busway section 10 along the cross-piece 18 described earlier with reference to FIG. 1. A molded plastic cover 40, which includes a planar top portion 40A and downwardly depending side portions 40B and 40C, is attached to the base 27 by means of a pivot post 41 integrally formed therein and extending between a pair of tabs 42, 43. The cover is attached to the base by positioning the pivot post 41 under a pair of curvilinear projections 32 extending from the planar top 33. A clearance slot 44 is defined between the pivot post 41 and the planar surface 40A of the cover to allow for the insertion of the curvilinear projections. The pivot post is similar to the hinge structure described within U.S. Pat. No. 4,688,146 entitled "Molded Plastic Enclosure for Electric Service Apparatus", which Patent is incorporated herein for purposes of reference. When the cover is so attached to the base, the bottom surfaces of the side 40B, 40C sit on the perimetric rim 47 defined along the outer part of the planar top portion 33. Rectangular projections 48, 49, formed on the cover opposite the top surface 40A, sit on the corresponding parts 47A, 47B of the perimetric rim 47 formed on the planar top portion 33. With the cover attached to the base, the angled projection 45 formed within the cover sits within the space 52 defined between the curvilinear projections 32. A pair of pins 45A, 45B on both sides of the projection hold the projection in a press-fit relation to firmly hold the cover in a closed position. A pair of similar curvilinear projections 32 and spaces 52 are formed on opposing ends of the planar top 33 to allow the cover to be attached on either side of the plug-in enclosure. With the cover attached to the base, and with the angled projection 45 positioned between the curvilinear projection 32 the digital access groove 31 allows an operator to move the angled projection 45 out of the press-fit relation between the curvilinear projections 32 and pins 45A, 45B and rotate the cover to its open position about the pivot post 41.

Figure 3:
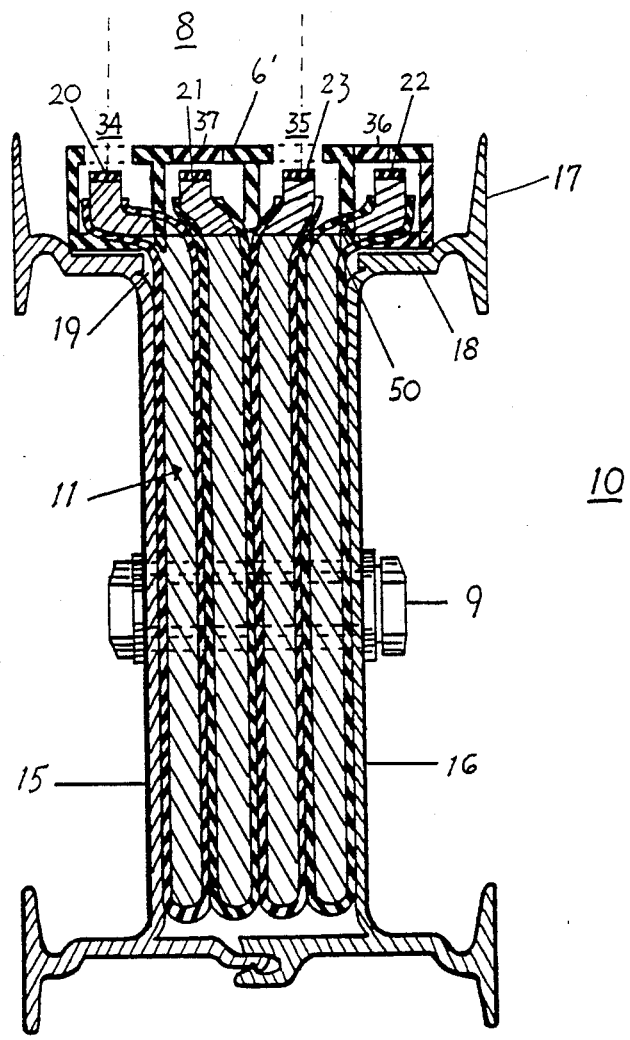
FIG. 3 is an enlarged cross-sectional view of a part of the busway distribution system of FIG. 1 viewed in the 3—3 plane.

The busway section 10 which includes the plug-in section 8 and the attached plug-in enclosure 6' depicted earlier in FIG. 1 is shown in FIG. 3. The first and second side frames 15, 16 are held together along with the bus conductors 11 by means of the thru-bolt 9. The plug-in enclosure 6' is attached to the cross-piece 18 between the upstanding rails 17. The attachment of the plug-in enclosure 6' to the cross-piece 18 automatically aligns the upstanding contact blade tabs 20–23 under the cross-piece slots 34–37 (FIG. 2) formed within the planar top portion 33, as indicated. The contact blade tabs 20–23 are shown relative to the center line defined by the cross-piece slots 19. The upstanding contact blade tabs are shown welded to the corresponding bus conductors as indicated at 50, as described in the aforementioned U.S. Patent Application Ser. No. 203,951.

An insulated plug-in enclosure has herein been described for insulating the upstanding contact blade tabs situated at predetermined intervals along an electric busway section. Besides electrically isolating the upstanding contact blade tabs, the plug-in enclosures facilitate connection between the contact blade tabs and a power take-off assembly by centering the contact blade tabs within predetermined spaced slots integrally formed within the plug-in enclosures.

Having thus described my invention, what I claim as new and desire to secure by Letters Patent is:

1. A molded plastic outlet box for electric busway systems comprising:
   a molded plastic base including means for attachment to an electric busway system at a bottom surface of said base and means defining a planar surface at a top surface of said base, said planar surface having a plurality of slots extending therethrough coextensive with bus bar contact blades extending from said busway system, said base further including a pair of side members extending downwardly from said planar surface;
   a molded plastic cover hingably and removably attached to one end of said top surface by means of a hinge pin; and
   a pair of first arcuate projections integrally formed on said top surface at said one end, said hinge pin being trapped under said first arcuate projections in press-fit relation therewith for holding said cover in an open position on said one end of said top surface.

2. The molded plastic outlet box of claim 1 including a rectangular projection integrally formed at an end of said cover opposite said hinge pin for holding said cover in closed position on said base.

3. The molded plastic outlet box of claim 2 including a perimetric rim defined around said planar surface and cooperating with a corresponding perimetric lip extending from said cover to provide a first insulative shield at an interface between said cover and said base when said cover is in said closed position.

4. The molded plastic outlet box of claim 1 wherein said plurality of slots are off-set from each other in a plane defined by said planar surface.

5. The molded Plastic outlet box of claim 1 including a U-shaped slot extending along each of said side members, said U-shaped slots cooperating with a corresponding pair of rectangular projections formed on a bottom surface of said cover to provide an insulative shield at said interface between said cover and said base.

6. The molded plastic outlet box of claim 1 including a ramp integrally formed between said bottom surface and said top surface.

7. The molded plastic outlet box of claim 6 including a groove formed within a top part of said ramp for receiving said hinge pin.

8. The molded plastic outlet box of claim 7 including a digit access slot formed on said top part of said ramp outboard said groove.

9. The molded plastic outlet box of claim 1 including a second pair of arcuate projections integrally formed on said top surface at an opposite end thereof, said hinge pin being optionally trapped under said second pair of arcuate projections in press-fit relation therewith for holding said cover in an open position on said opposite end of said base.

10. The molded plastic outlet box of claim 2 including a pair of pins integrally formed on each side of said rectangular projections to hold said cover in said press-fit relation on said base.

* * * * *